United States Patent Office 3,246,022
Patented Apr. 12, 1966

3,246,022
3-ARYL-17β-OXY(ANDROSTA/ESTRA)-3,5-DIENES
Leland J. Chinn, Morton Grove, Ill., assignor to G. D. Searle & Co., Chicago, Ill., a corporation of Delaware
No Drawing. Filed June 4, 1964, Ser. No. 372,670
6 Claims. (Cl. 260—397.5)

This invention relates to 3-aryl-17β-oxy(androsta/estra)-3,5-dienes and processes for the preparation thereof. More particularly, this invention provides novel, useful, and unobvious chemical compounds of the formula

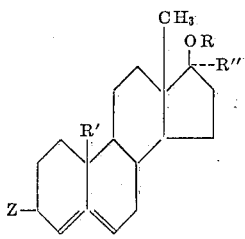

wherein R represents hydrogen or an alkanoyl radical; R' represents hydrogen or a methyl radical; R" represents an alkyl, alkenyl, or alkynyl radical; and Z represents a monovalent, aromatic, hydrocarbon radical optionally substituted by 1 or more halogens.

Among the alkanoyl radicals represented by R, especially lower alkanoyl radicals are preferred, which is to say radicals of the formula

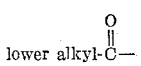

wherein the lower alkyl grouping is methyl, ethyl, propyl, isopropyl, butyl, sec-butyl, tert-butyl, pentyl, neopentyl, hexyl, isohexyl, heptyl, or like monovalent, saturated, acyclic straight- or branched-chain, hydrocarbon moiety of the formula

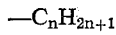

in which $n$ represents a positive integer less than 8.

R" in the formula preferably represents a lower alkyl radical—as defined above—or a vinyl or ethynyl grouping.

The aryl radicals represented by Z include phenyl, naphthyl, biphenyl, and comparable monovalent, aromatic groupings; and the optional halogen substituents therein are fluorine, chlorine, and/or bromine. Preferred embodiments of Z, however, are phenyl, chlorophenyl, and bromophenyl radicals, the halogen atom referred to being variously o, m, or p to the point of attachment to the steroid nucleus.

The compounds to which this invention relates are characterized by valuable pharmacological properties. Thus, for example, they share with estrone a capacity to inhibit uterine response to progestrone. And, like cortisone, they reduce edema formation associated with the inflammatory response to tissue insult.

Preparation of the 17-ols of this invention proceeds by heating a corresponding 4-en-3-one

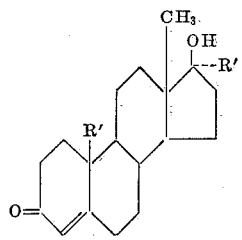

with an appropriate Grignard reagent

in ethereal solvent and contacting the resultant mixture with aqueous mineral acid. (R', R", and Z in the latter two formulas have the same meanings previously assigned.) The 17-esters hereof are prepared by contacting the 17-ols during several hours with pyridine and a selected acid anhydride

or halide

R being defined as before.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

*Example 1*

*3-phenylestra-3,5-dien-17β-ol.*—To a mixture of 326 parts of phenylmagnesium bromide with approximately 840 parts of diethyl ether is added a solution of 31 parts of 17β-hydroxyestr-4-en-3-one in a mixture of 180 parts of tetrahydrofuran and 140 parts of diethyl ether. The resultant mixture is stirred at the boiling point under reflux for 20 hours, then cooled to around 10° and acidified with dilute hydrochloric acid. The organic phase is separated; consecutively washed with 5% hydrochloric acid, water, aqueous 5% sodium bicarbonate, water, and saturated aqueous sodium chloride; dried over anhydrous sodium sulfate; and stripped of solvent by vacuum distillation. The residue, upon crystallization from a mixture of diethyl ether and pentane, affords 3-phenylestra-3,5-dien-17β-ol as colorless laths melting at 128–132°. The product has the formula

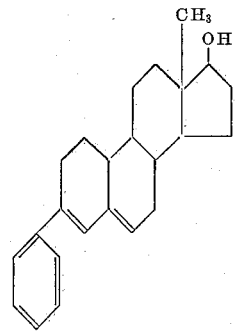

Example 2

*17β-acetoxy-3-phenylestra-3,5-diene.*—A solution of 1 part of 3-phenylestra-3,5-dien-17β-ol in a mixture of 10 parts of pyridine and 10 parts of acetic anhydride is allowed to stand at room temperatures for 17 hours. The solution is then poured into 10 volumes of ice water, and the resultant mixture is acidified with dilute hydrochloric acid. The gummy precipitate thrown down is filtered off, washed with water, dried in air, and crystallized from a mixture of diethyl ether and pentane to give 17β-acetoxy-3-phenylestra-3,5-dien as colorless nondescript crystals melting at 158–159.5°. The product has the formula

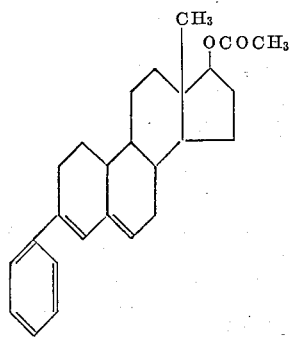

Example 3

*17α-ethyl-3-phenylestra-3,5-dien-17-ol.*—To a mixture of 326 parts of phenylmagnesium bromide with approximately 840 parts of diethyl ether is added a solution of 30 parts of 17α-ethyl-17-hydroxyestr-4-en-3-one in a mixture of 180 parts of tetrahydrofuran with 140 parts of diethyl ether. The resultant mixture is stirred at the boiling point under reflux for 20 hours, then cooled to around 10° and acidified with dilute hydrochloric acid. The organic phase is separated; washed successively with 5% hydrochloric acid, water, aqueous 5% sodium bicarbonate, water, and saturated aqueous sodium chloride; dried over anhydrous sodium sulfate; and stripped of solvent by vacuum distillation. Crystallization of the residue from diethyl ether affords 17α-ethyl-3-phenylestra-3,5-dien-17-ol as colorless plates melting at 149–151.5°. The product has the formula

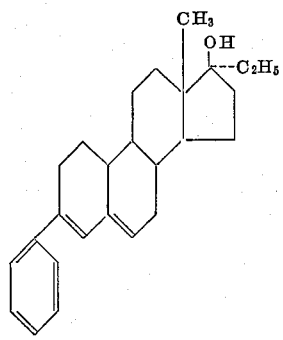

Example 4

*17α-ethynyl-3-phenylestra-3,5-dien-17-ol.*—To a mixture of 544 parts of phenylmagnesium bromide with 1400 parts of diethyl ether is added a solution of 50 parts of 17α-ethynyl-17-hydroxyestr-4-en-3-one in 540 parts of tetrahydrofuran. The resultant mixture is stirred at the boiling point under reflux for 15 hours, then cooled and acidified with dilute hydrochloric acid. The organic phase is separated; washed successively with 5% hydrochloric acid, water, aqueous 5% sodium bicarbonate, water, and saturated aqueous sodium chloride; dried over anhydrous sodium sulfate; and stripped of solvent by vacuum distillation. The residue is chromatographed on silica gel, using benzene and ethyl acetate as developing solvents. From a pure benzene eluate, on evaporation of solvent and crystallization of the residue from a mixture of diethyl ether and pentane, 17α-ethynyl-3-phenylestra-3,5-dien-17-ol is obtained as colorless rods melting at 173–174.5°. The product has the formula

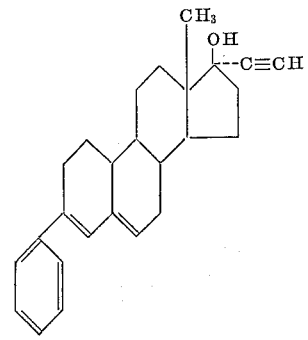

Example 5

*17β-acetoxy-17-ethynyl-3-phenylestra-3,5-diene.*—A solution of 1 part of 17α-ethynyl-17-hydroxyester-4-en-3-one in a mixture of 10 parts of pyridine with 10 parts of acetic anhydride is maintained at 80° for 65 hours, then poured into 10 volumes of ice water. The precipitate thrown down is collected on a filter, washed with water, dried in air, and crystallized from ethyl acetate to give 17β-acetoxy-17-ethynyl-3-phenylestra-3,5-diene as colorless laths melting at 227–229°. The product has the formula

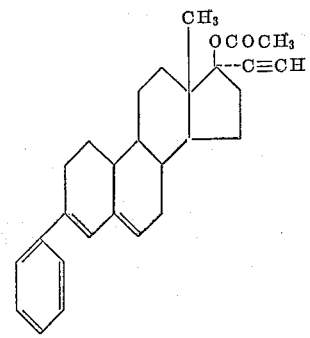

Example 6

*3-phenyl-17α-vinylandrosta-3,5-dien-17-ol.*—To a mixture of 544 parts of phenylmagnesium bromide with 1400 parts of diethyl ether is added a solution of 57 parts of 17β-hydroxy-17α-vinylandrost-4-en-3-one in 540 parts of tetrahydrofuran. The resultant mixture is stirred at the boiling point under reflux for 15 hours, then cooled to around 10° and acidified with dilute hydrochloric acid. The organic phase is separated; washed successively with 5% hydrochloric acid, water, aqueous 5% sodium bicarbonate, water, and saturated aqueous sodium chloride; dried over anhydrous sodium sulfate; and stripped of solvent by vacuum distillation. The residue is crystallized from a mixture of diethyl ether and pentane to give 3-phenyl-17α-vinylandrosta-3,5-dien-17-ol as colorless plates melting at 185.5–189°. The product has the formula

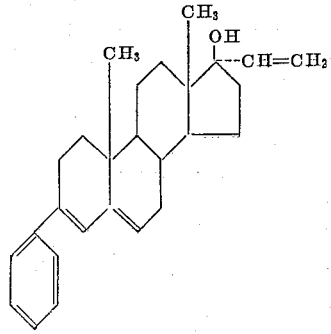

Example 7

*3-(p-chlorophenyl)-17α-ethylestra-3,5-dien-17-ol.*—To a mixture of 362 parts of p-chlorophenylmagnesium bromide with approximately 840 parts of diethyl ether is added a solution of 30 parts of 17α-ethyl-17-hydroxyestr-4-en-3-one in a mixture of 180 parts of tetrahydrofuran with 140 parts of diethyl ether. The resultant mixture is stirred at the boiling point under reflux for 20 hours, then cooled to around 10° and acidified with aqueous hydrochloric acid. The organic phase is separated; washed successively with 5% hydrochloric acid, aqueous 5% sodium bicarbonate, water, and saturated aqueous sodium chloride; dried over anhydrous sodium sulfate; and stripped of solvent by vacuum distillation. The residue is chromatographed on silica gel, using benzene and ethyl acetate as developing solvents. From an eluate comprising 2% ethyl acetate in benzene, on evaporation of solvent and crystallization of the residue from a mixture of ether and pentane, 3-(p-chlorophenyl)-17α-ethylestra-3,5-dien-17-ol is obtained as colorless platelets melting at 163.5–165.5°. The product has the formula

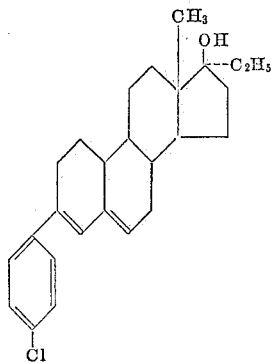

Example 8

*3-(p-chlorophenyl)-17α-ethynylestra-3,5-dien - 17-ol.*—To a mixture of 601 parts of p-chlorophenylmagnesium bromide with approximately 1400 parts of diethyl ether is added a solution of 50 parts of 17α-ethynyl-17-hydroxyestr-4-en-3-one in 540 parts of tetrahydrofuran. The resultant mixture is stirred at the boiling point under reflux for 15 hours, then cooled to around 10° and acidified with dilute hydrochloric acid. The organic phase is separated; washed successively with 5% hydrochloric acid, water, aqueous 5% sodium bicarbonate, water, and saturated aqueous sodium chloride; dried over anhydrous sodium sulfate; and stripped of solvent by vacuum distillation. The residue is chromatographed on silica gel, using benzene and ethyl acetate as developing solvents. From a pure benzene eluate, on evaporation of solvent and crystallization of the residue from methanol, is obtained 3-(p-chlorophenyl)-17α-ethynylestra-3,5-dien-17-ol as colorless plates melting at 160.5–165°. The product has the formula

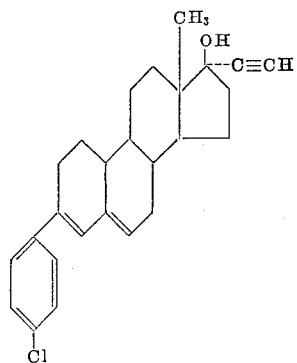

Example 9

*17β-acetoxy-3-(p-chlorophenyl) - 17 - ethynylestra-3,5-diene.*—A solution of 6 parts of 17α-ethynyl-17-hydroxyestr-4-en-3-one in a mixture of 60 parts of pyridine with 60 parts of acetic anhydride is heated at the boiling point under reflux in a nitrogen atmosphere for 17 hours, then concentrated to one half volume by vacuum distillation. The concentrate is cooled and thereupon diluted with 10 volumes of ice water. The mixture thus obtained is acidified with dilute hydrochloric acid. The solid thrown down is filtered off, washed with water, dried in air, and crystallized from diethyl ether to give 17β-acetoxy-3-(p-chlorophenyl)-17-ethynylestra - 3,5 - diene as colorless plates melting at 201.5–203.5°. The product has the formula

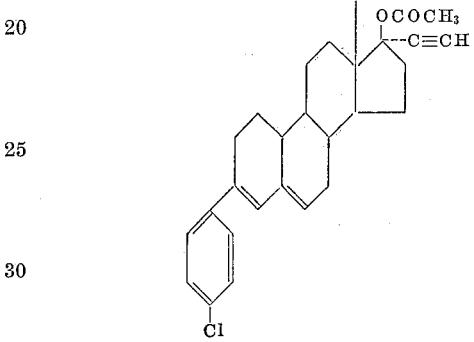

Example 10

*3-(m-bromophenyl) - 17α - methylandrost-3,5-dien-17-ol.*—To a mixture of 468 parts of m-bromophenylmagnesium bromide with approximately 840 parts of diethyl ether is added a solution of 34 parts of 17β-hydroxy-17-methylandrost-4-en-3-one in a mixture of 180 parts of tetrahydrofuran with 140 parts of diethyl ether. The resultant mixture is stirred at the boiling point under reflux for 20 hours, then cooled to around 10° and acidified with dilute hydrochloric acid. The organic phase is separated; washed successively with 5% hydrochloric acid, water, aqueous 5% sodium bicarbonate, water, and saturated aqueous sodium chloride; dried over anhydrous sodium sulfate; and stripped of solvent by vacuum distillation. The residue is 3-(m-bromophenyl)-17α-methylandrost-3,5-dien-17-ol, having the formula

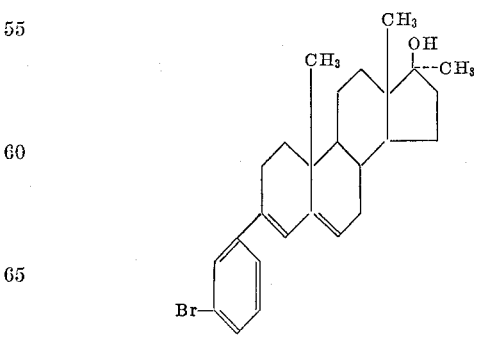

Example 11

*3-(p-chlorophenyl) - 17α - ethynylandrost-3,5-dien-17-ol.*—To a mixture of 601 parts of p-chlorophenylmagnesium bromide with approximately 1400 parts of diethyl ether is added a solution of 52 parts of 17α-ethynyl-17- hydroxyandrost-4-en-3-one in 540 parts of tetrahydrofuran. The resultant mixture is stirred at the boiling point under reflux for 15 hours, then cooled to around 10° and acidified with dilute hydrochloric acid. The organic phase is separated; washed successively with 5% hydrochloric acid, water, aqueous 5% sodium bicarbonate, water, and saturated aqueous sodium chloride; dried over anhydrous sodium sulfate; and stripped of solvent by vacuum distillation. The residue is chromatographed on silica gel, using benzene and hexane as developing solvents. From an eluate comprising 60% benzene in hexane, on evaporation of solvent and crystallization of the residue from a mixture of diethyl ether and pentane, 3-(p-chlorophenyl)-17α-ethynylandrost-3,5-dien-17-ol is obtained as colorless, densely-packed platelets melting at 184.5–189°. The product has the formula

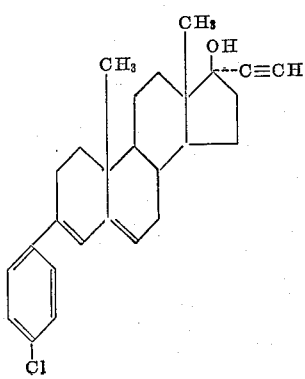

What is claimed is:
1. A compound of the formula

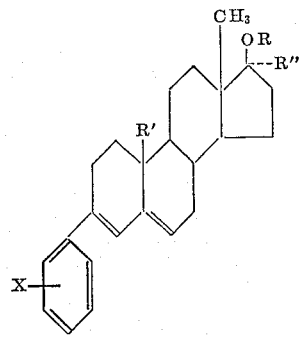

wherein R represents a member of the class consisting of hydrogen and a lower alkanoyl radical; R' represents a member of the class consisting of hydrogen and the methyl radical; R" represents a member of the class consisting of hydrogen and methyl, ethyl, vinyl, and ethynyl radicals; and X represents a halogen of atomic number greater than 9 and less than 53.

2. 3-phenylestra-3,5-dien-17β-ol.
3. 17α-ethynyl-3-phenylestra-3,5-dien-17-ol.
4. 3-phenyl-17α-vinylandrosta-3,5-dien-17-ol.
5. 3-(p-chlorophenyl)-17α-ethylestra-3,5-dien-17-ol.
6. 3-(p-chlorophenyl)-17α-ethynylestra-3,5-dien-17-ol.

References Cited by the Examiner

Ercoli et al., J.A.C.S. 82, p. 746–48 (1960).

LEWIS GOTTS, *Primary Examiner.*